United States Patent [19]

Tofe

[11] Patent Number: 5,711,015

[45] Date of Patent: Jan. 20, 1998

[54] CHEMICAL DECONTAMINATION USING NATURAL OR ARTIFICIAL BONE

[76] Inventor: Andrew J. Tofe, 2195 Urban Dr., Lakewood, Colo. 80215

[21] Appl. No.: 588,766

[22] Filed: Jan. 19, 1996

[51] Int. Cl.[6] .................................................... G21F 9/00
[52] U.S. Cl. ............................ 588/1; 210/679; 210/682; 502/400; 502/516
[58] Field of Search ................. 588/1; 210/679, 210/682; 502/400, 516

[56] References Cited

U.S. PATENT DOCUMENTS

| | | |
|---|---|---|
| 2,766,204 | 10/1956 | Lowe . |
| 3,183,059 | 5/1965 | Reisenauer et al. . |
| 4,442,028 | 4/1984 | Wolf et al. .................... 252/628 |
| 4,443,339 | 4/1984 | Rosevear .................... 210/635 |
| 4,794,171 | 12/1988 | Tagaya et al. .................... 530/417 |
| 4,995,985 | 2/1991 | Scott et al. .................... 210/679 |
| 5,382,653 | 1/1995 | Jordaan et al. .................... 528/392 |
| 5,512,702 | 4/1996 | Ryan et al. .................... 588/256 |

OTHER PUBLICATIONS

D.E. Blanc, et al, Removal of plutonium from High Level Caustic Waste Solution Using Bone Char:pilot study, 1978, 13 pgs.

*Primary Examiner*—Ngoclan Mai
*Attorney, Agent, or Firm*—Davis, Graham & Stubbs, LLP

[57] ABSTRACT

A method of decontaminating a site of metals, particularly radioactive metals, is provided. The contaminated material is contacted with pulverized bone, which sorbs the metals from the contaminated material. The bone may be derived from any animals having bone, such as cattle. Prior to use, the organic compounds of the bone are removed, so that inorganic bone composed primarily of hydroxylapatite is obtained. The morphology of the bone, including its crystalline structure and porosity, is maintained. As an alternative to bone derived from animals, synthetic inorganic bone composed of hydroxylapatite and having a physical structure equivalent to animal-derived bone may be used.

20 Claims, No Drawings

CHEMICAL DECONTAMINATION USING NATURAL OR ARTIFICIAL BONE

FIELD OF THE INVENTION

The present invention relates to the field of chemical treatment and decontamination, and more particularly to the removal of heavy metals and radioactive substances from a contaminated area by introducing natural or artificial bone as a sorbent into the contaminated area.

BACKGROUND OF THE INVENTION

Transuranic elements such as plutonium and other radioactive elements and isotopes are highly carcinogenic and pose a health hazard to human and animal life. These substances are particularly hazardous because they are attracted to and collect in bone, where they may cause, among other ailments, bone cancer. Such substances are generated in nuclear power generation and nuclear weapons production and reprocessing facilities. They are also used and generated in other applications. These substances may leak from the facilities wherein they are produced or used in an acute episode, such as in a full of partial melt-down of a nuclear power plant. They may also accumulate gradually in and around production facilities during the normal course of operation. Because such substances may be hazardous even in minute quantities and may become widely dispersed, it may be necessary to decontaminate large ares.

Numerous methods of treating such substances have been developed. Known methods include chemical precipitation, chemical oxidation and radiation, filtration, electrochemical oxidation and reduction, evaporative recovery, and ion exchange. See, generally, Separation Techniques in Nuclear Waste Management (edited by Carleson et al., CRC Press, Inc., 1996). Ion exchange phases, such as solids, are preferably preprocessed into a liquid phase before being exposed to the bone. This may be done in a variety of ways, such as by grinding the solid into particulates and mixing the particulates in water (or other liquid). The resulting mix may then be treated as described above. An alternative method of treating a solid is to suspend the bone in a liquid (first pulverizing or grinding the bone, as described below), and to apply the suspension to the solid.

The bone may be obtained from virtually any animal that has bone. It is contemplated that the bone will come from domesticated animals of which a large supply of carcasses exists, such as cattle. The bone may be separated from the animal carcass by any known rendering means, provided that the overall chemical and physical structure of the hydroxylapatite is maintained. The bone is preferably prepared by removing the organic compounds from the bone, as these compounds hinder the sorption of metal by the bone. This may be done through heating, or by chemical extraction.

The bone is further prepared by pulverizing or grinding it to a fine particulate state. Finer pulverization allows for a greater quantity of metal sorption, as the metal is primarily adsorbed on the surface of the bone rather than absorbed within the bone. Finer pulverization also increases the rate at which metal is sorbed. However, an overly fine particulate size may be difficult to physically control, without providing any sorbing advantages. A wide range of particulate size may yield satisfactory results.

Synthetic bone may used instead of or in addition to natural bone. Such synthetic bone must be composed primarily of hydroxylapatite, and must have essentially the same morphological structure as animal derived bone. As with the animal bone preferably used in techniques have received attention because of high extraction capacity and good radioactive and chemical stability, and also because they are more cost effective than other techniques. Specific sorbents that have received attention include titanium phosphates, zeolites, silicotitanates, and some forms of clay. Additionally, the family of compounds known as apatites have been used as an ion exchange medium for chemical decontamination. For example, an early use of a specific apatite, described as Florida apatite, is disclosed in U.S. Pat. No. 3,183,059 of Reisenauer et al.

The apatite hydroxylapatite ($Ca_5(PO_4)_3(OH)$) (also known as "hydroxapatite") is the primary mineral component of bone and provides its core physical structure. Hydroxylapatite has also been used in chemical treatment. For example, U.S. Pat. No. 4,442,028 of Wolf et al. describes the use of hydroxylapatite in an intermediate step in a treatment method for radioactive phosphoric acid solutions, where the hydroxylapatite is mixed with portland cement to form concrete. The use of bone derivatives has also been described in chemical treatment schemes, as in U.S. Pat. No. 4,995,985 of Scott et al., which describes the decontamination of metals from substances through the use of "gel beads" formed of propylene glycol and bone gelatin. However, it is believed that the presence of organic substances of the Scott et al. process reduces the effectiveness of metal sorption.

The process described by Reisenauer et al., while somewhat effective in utilizing the Florida apatite form of hydroxylapatite, is not optimized to adsorb metallic contaminants. Other similar decontamination processes, such as the process described in U.S. Pat. No. 2,766,204 of Lowe, involve calcium phosphates, but also fail to disclose a preferred physical structure thereof. Japanese patent document 05066295-A discloses a process of treating liquids containing radioactive materials by immersing a chitinous substance into the liquid.

Summarizing, the prior art methods have made use of the chemical composition of bone, through sorption techniques involving hydroxylapatite. They have not, however, fully exploited the unique structural and morphological characteristics of bone that, along with its chemical composition, maximize its effectiveness as a metal sorbent.

SUMMARY OF THE INVENTION

The present invention provides a method of decontaminating a site of metals by sorbing the metals with bone particulate matter. The contaminating metals may include, among others, radioactive substances such as plutonium and other transuranic elements and radioactive isotopes of alkali and alkaline-earth metals. Sorption results from the contact of the metals with the hydroxylapatite of which bone is primarily composed. While untreated bone (i.e., bone similar to its condition when it is in a live animal) may be used, more effective sorption occurs when the organic compounds of the bone are removed. A synthetic bone, composed primarily of hydroxylapatite and having a morphological structure similar to animal-derived bone, may also be used.

The bone may be used to decontaminate a variety of sites, including liquid, solid, and mixed sites. The method of introducing the bone to the site will vary with the site. A liquid site may be treated by placing the bone in a liquid permeable but solid impermeable container, and placing the container within the liquid. After the metal has been sorbed, the bone may be disposed of in a secure or remote location. Contaminants in other the present invention, such synthetic bone has substantially no organic component.

DETAILED DESCRIPTION OF THE INVENTION

The present invention involves the use of bone to sorb metal and metal compounds for the purpose of decontamination. The invention is particularly effective with transuranic elements such as plutonium and radioactive alkali or alkaline-earth metals, although it is effective to treat other compounds as well. The bone may be treated and is preferably obtained from widely available animals such as cattle or hogs. Alternatively, synthetic bone may be used. The synthetic bone must approximate the chemical composition of natural bone, and the morphological structure must also be similar for maximum effectiveness.

The bone is introduced to the chemical site that is to be treated and decontaminated. Depending upon the source of the compound and the nature of the contaminated site, the method of introduction may take a variety of forms. For instance, the contamination site may be an aqueous or other liquid body, such as a pond as are commonly maintained at nuclear power plants as temporary disposal sites for radioactive liquids. The contamination site may also be a solid or mixed phase environment. The bone may be introduced to the contamination site in various ways depending on the type of contamination site.

At a liquid site such as a pond, for example, crushed, pulverized bone may be packed into a container with an opening such as a sieve, permitting liquid to be introduced into the container but preventing the bone particulates from escaping therefrom. The container may then be placed in a contaminated pond. The container and the pond may be placed in relative motion, such as by moving the container throughout the pond or by agitating the pond, to increase the contact between the bone and the liquid. At its simplest, such a container may be made of a liquid permeable but solid impermeable fabric, akin to a tea bag. A liquid stream may treated similarly, such as by directing the stream through a column containing pulverized bone. Once the contaminants have been localized by sorption into the bone, the bone may be stored or disposed of in a secure location.

To treat a solid or mixed phase site, the site is preferably first preprocessed into a liquid form. This may be done in various ways depending on the specific structure of the site. In general, the contaminated solids are mixed with a liquid, so that the resulting mix may be treated as described above. Depending on the size of the solids, they may need to ground or crushed or otherwise processed before they are mixed with liquid.

An alternative method of treating a solid is to suspend the bone in a liquid and to apply the resulting suspension to the solid, such as by pouring the liquid over the solid. In this alternative method, the bone is first pulverized so that it thoroughly mixes with the liquid. This alternative method may be particularly useful to treat large, diffuse solid or mixed phase sites, such as plots of dirt or other landfill. It should also be appreciated that both the contaminant and bone may be liquified prior to treatment.

Any animal bone may be used in the present invention. Current economic considerations favor the use of cattle and hogs; however, other animal bones could also be used in addition to or instead of cattle or hogs. The bone may be separated from the remainder of the animal carcasses by any known means, such as those typically used in rendering plants. Care must be taken to avoid overheating the bone, should heat be used, as this may decompose the hydroxylapatite or may otherwise damage the morphological structure of the bone.

An important aspect of the invention is that the organic compounds, and more particularly the protein compounds, that are contained on or within the bone should be removed. These protein and other organic compounds interfere with the sorption of plutonium and other metal contaminants by the bone. Thus, a lesser quantity of bone with organic compounds removed may sorb as much metal as greater quantity of untreated bone. Also, the time rate of sorption may be higher when the organic bone compounds have been removed.

Once the bone is separated from the animal carcass and rid of its organic component, it may be pulverized to a desired particulate size. Since the bone primarily attracts metallic contaminants through adsorption rather than absorption, a finer pulverization will enable a greater quantity of metal to be captured within the bone by producing a greater surface area than will a coarser pulverization. However, too fine of pulverization may result in a material that is difficult to handle. Also, depending on the depth of adsorption, which is specific to the metal contaminant and type of bone that is used, extremely fine pulverization may not yield any sorption advantages if the particulate thickness is less than the depth of adsorption. A bone particle size of approximately 0.1 mm cross section yields good results, although significantly larger (such as pebble sized particulates with a cross section in the centimeter range) or smaller bone particles may also be used. As discussed above, the method of application of bone to the contaminated site may also be a consideration in particle size selection; if the bone is suspended in a liquid prior to treatment, it should be processed into very fine particulates.

Synthetic bone may be used instead of bone derived from animals. Here, "synthetic bone" is used to describe a substance primarily composed of hydroxylapatite, with a morphology, crystal structure, and porosity that approximates natural bone that has had its organic compounds removed. Such a synthetic bone is much more easily produced than is living bone, as complicated compounds such as bone marrow do not need to be replicated. The synthetic bone may be used for site decontamination in exactly the same manner as may natural bone, described above. Depending upon the method of manufacturing the synthetic bone, it may be manufactured as a fine particulate of the desired size, thereby eliminating the pulverizing or grinding step required for natural bone.

What is claimed is:

1. A method of decontaminating a site of metals comprising:

establishing a quantity of bone;

contacting said metals with said quantity of bone:

maintaining said contact for a sufficient time so that at least some of said metals are sorbed by at least some of said quantity of bone; and terminating contact between said metals and saint quantity of bone wherein said quantity of bone has had its organic compounds removed prior to said contacting.

2. The method of claim 1, wherein said quantity of bone has been pulverized or ground into particulates.

3. The method of claim 2, wherein substantially all of said particulates have an approximate cross section of less than 0.1 mm.

4. The method of claim 2, wherein substantially all of said particulates have an approximate cross section of 0.1 mm to 10 mm.

5. The method of claim 2, wherein said quantity of bone is any animal bone.

6. The method of claim 5, wherein said quantity of bone is derived at least partially from a cattle carcass.

7. The method of claim 5, wherein said quantity of bone is derived at least partially from a hog carcass.

8. The method of claim 2, wherein said metals are selected from the group consisting of the transuranic elements.

9. The method of claim 8, wherein said metals are plutonium.

10. The method of claim 2, wherein said metals are radioactive.

11. A method of decontaminating a site of metals, comprising:

establishing a quantity of bone;

contacting said metals with said quantity of bone;

maintaining said contact for a sufficient time so that at least some of said metals are sorbed by at least some of said quantity of bone; and terminating contact between said metals and said quantity of bone;

wherein said bone is synthetic bone.

12. The method of claim 11, wherein said synthetic bone is composed primarily of hydroxylapatite having a morphological structure substantially equivalent to natural bone and containing substantially no organic compounds.

13. The method of claim 2, wherein said site is a liquid, and said contacting is performed by placing said particulates in a container that is liquid permeable and sold impermeable, and placing said container in fluid communication with said liquid.

14. The method of claim 13, wherein said liquid is an aqueous stream, and said contacting is performed by establishing liquid flow through said container, said maintaining contact occurs while the liquid flows through said container, and said terminating contact occurs when said liquid flows out of said container.

15. The method of claim 14, wherein said container has an inlet and an outlet, and at least one of said inlet or outlet is a sieve.

16. The method of claim 14, further comprising: disposing of said particulates after said metal has been sorbed by said particulates.

17. The method of claim 3, wherein said particulates are suspended in a liquid prior to said contacting.

18. The method of claim 17, wherein said site is a solid.

19. A synthetic bone useful for sorption of metal compounds, comprising: hydroxylapatite having a morphological structure substantially equivalent to natural bone.

20. The synthetic bone of claim 19, wherein substantially no organic compounds are contained within the bone.

* * * * *